Nov. 25, 1969 B. SHERSTIUK 3,480,913

MARKING ARRANGEMENT FOR A CROSS-POINT SWITCHING SYSTEM

Filed March 27, 1967 2 Sheets-Sheet 1

INVENTOR.
BORIS SHERSTIUK

BY Bernard E. Franz

ATTY.

Nov. 25, 1969 B. SHERSTIUK 3,480,913

MARKING ARRANGEMENT FOR A CROSS-POINT SWITCHING SYSTEM

Filed March 27, 1967

2 Sheets-Sheet 2

United States Patent Office 3,480,913

Patented Nov. 25, 1969

4,480,913

MARKING ARRANGEMENT FOR A CROSS-POINT SWITCHING SYSTEM

Boris Sherstiuk, Chicago, Ill., assignor to Automatic Electric Laboratories, Inc., a corporation of Delaware Filed Mar. 27, 1967, Ser. No. 626,090
Int. Cl. H04q *1/00, 3/00*
U.S. Cl. 340—166 4 Claims

ABSTRACT OF THE DISCLOSURE

Apparatus for establishment of a communication path in a multi-stage relay cross-point switching system employing a single winding relay for each cross-point and having a make contact connected in series with its operating winding. A Zener diode connected in series with a marking potential to the junction between the winding and the make contacts of inter-stage links, provides an operating path for the associated relay. Each relay in the selected path is then sequentially operated starting from a particular end with succeeding relays operating upon the closing of the contacts of its immediately preceding relay. The closing of these contacts, in addition to extending an operating potential to the succeeding relay, serves to extinguish the associated Zener diode.

BACKGROUND OF THE INVENTION

Field of the invention

Figure 1:
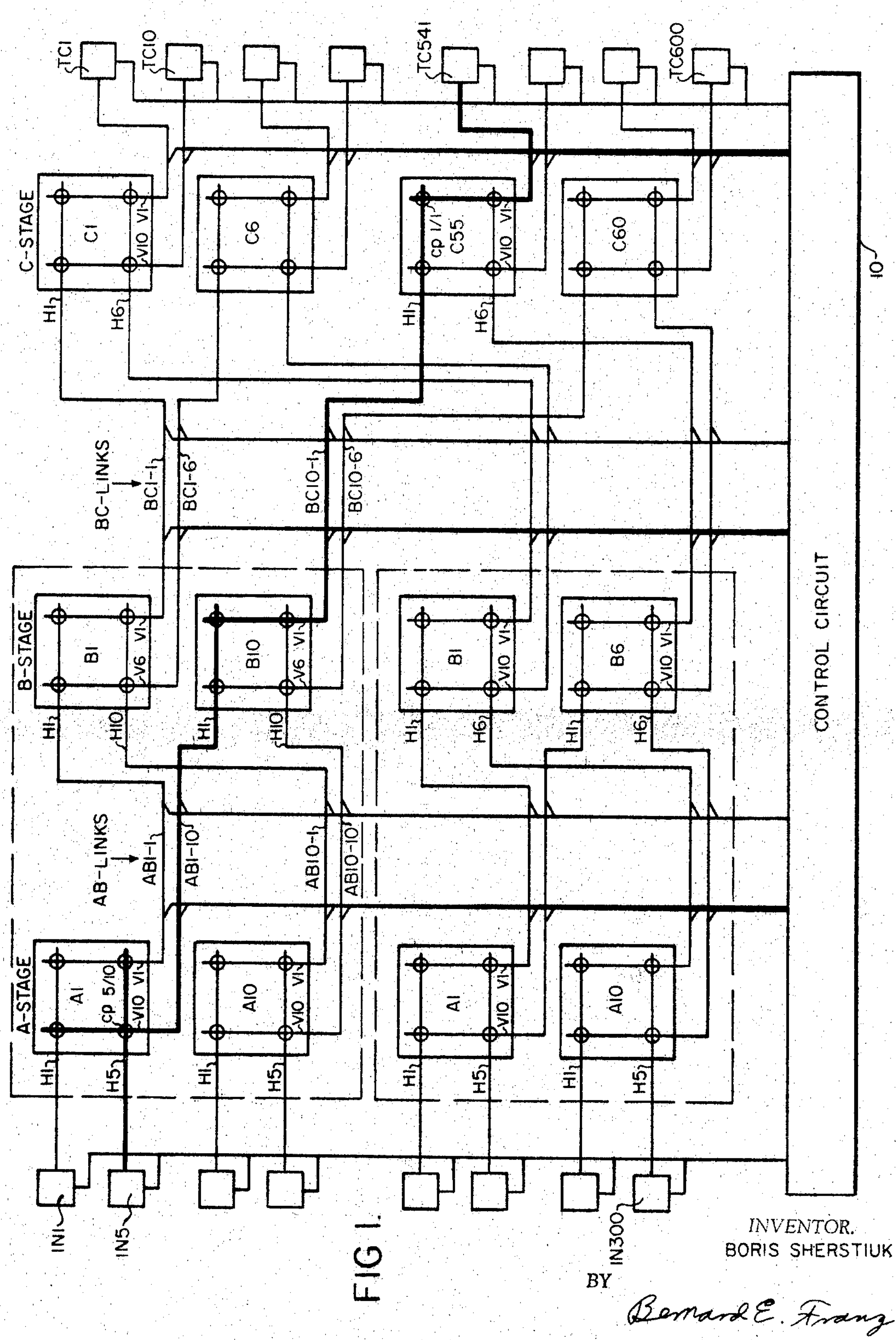

This invention relates to a single winding relay cross-point switching system, and more particularly to an arrangement in a control circuit for operating and holding the cross-point relays.

Description of the prior art

As is known, a relay cross-point switching system employs "switches" each made up of a coordinate array of relay contact sets of which there is one such contact set at each cross-point between a plurality of vertical multiples and a plurality of horizontal multiples, each such multiple comprising a number of conductors according to the number of physical connections required to be established through the array to set up a single communication path through it. For instance, in a telephone exchange each multiple may comprise conductors corresponding to the + and — wires of a subscriber's line, together with other conductors affording control connections required, for instance, for line testing and holding purposes. Usually each contact set is controlled by an individual relay and will be so assumed herein, but the possibility is not excluded of the contacts of a set being controlled by two or more relays acting equivalently to a single relay. The terms horizontal and vertical in the context of co-ordinate switching are used only as a convenient mode of identifying the respective co-ordinate multiples: these multiples are not necessarily disposed horizontally and veritcally in a practical layout.

Co-ordinate switching arrays as aforesaid are usually arranged in a number of switching stages each of which comprises a number of such arrays, and each affording access to some or all of the arrays in an adjacent stage. Adjacent stages are interconnected by multi-conductor paths, herein called links, which extend between the horizontal or vetrical multiples of the switching arrays of one stage and horizontal or vertical multiples of the switching arrays of the next stage. By selective operation of the relays a communication path can be established, over the switching stages and the links between them, between multi-conductor trunks (as they will be called) which are connected to horizontal or vertical multiples of the switching arrays in the first and last, respectively, of the switching stages concerned. These trunks may extend, for instance, towards subscribers' lines on the one hand and towards other exchange equipment such as registers or supervisory circuits on the other hand, or towards the registers on one hand and towards trunks extending to other exchanges. The establishment of such communication path between any two trunks is controlled by a control circuit which acts in dependence on the particular trunks involved and on which links are available and suitable for establishing the communication path between these trunks through the switching stages.

A relay cross-point switching system of the general type here under discussion is disclosed in U.S. Patent No. 3,129,293 by B. J. Warman. In that system a communication path is established, sequentially, commencing from one or the other end of the selected path. That is, marking potential is applied, in turn, to each cross-point relay involved in a selected path. However it requires and employs a means for simultaneously removing the potential from an operated cross-point relay while a potential of different magnitude is applied to the next cross-point relay in the path.

Another system using single winding relay cross-points of the type used in the above-mentioned B. J. Warman patent is disclosed in U.S. Patent 3,271,523 by K. Karrer. This patent discloses a single winding relay cross-point, requiring two marking leads, one on each side of each cross-point, and does not include a diode on the marking leads.

SUMMARY OF THE INVENTION

One object of the present invention is to provide a path-establishing and holding arrangement in a communication switching system of the common control type, using a multi-stage relay cross-point network employing single-winding relay cross-points.

Another object of the invention is to provide a path establishing arrangement which can simultaneously apply a pulling potential to the selected path in the multi-stage cross-point network, between the two end terminals, and which will eliminate switching means for sequentially removing one potential from the cross-point relay while applying another and different potential to a subsequent relay, involved in the selected path, whereby a common control circuit requires less operating time in establishing a communication path and is more economical.

The invention is embodied in a multi-stage co-ordinate matrix cross-point switching system which employs a relay for each cross-point. Each relay has an operating winding and a make contact in series therewith connected between control conductors included in the multiples defining the cross-point. With respect to any possible communication path through the stages there can be established via the control conductors of the inter-stage links a control connection including the series-connected operating winding and make contact of a relay in each stage, the winding of such relay being in each case electrically nearer a particular end of the control connection than is the contact; and a marking connection including a unidirectionally conductive device from the junction between the winding of each relay and its make contact in series wi'h it taken to the common control circuit for selectively connecting an operating potential to said marking connections for establishing a communication path. According to the invention, there is provided a device such as a Zener diode connected in series with the marking potential and the marking connections, whereby an operating potential can be applied simultaneously to the stages of the selected communication path. To establish such communication path, the two end terminals, and a cross-point in each stage, through which a communication path is to be established, are selected and marked. An operating potential is applied simultaneously to one end of the selected path and to said marking connections of the interstage links included in said path. The operating potential first extends through the winding of a first cross-point relay to the marking potential via the Zener diode connected in series. Upon closure of the contacts connected in series with the winding of the first relay the operating potential is extended to the next cross-point relay in the path and the first Zener diode shut-off. After establishment of the communication path, that is, after operation of the last relay in said sequence, the Zener devices are shut off. The holding connection for the operated relays is completed between the holding potential connected at one end of the control connection having a polarity which is opposite to that of the operating potential with respect to the marking potential, and a potential approximating the marking potential and connected at the same end of the control connection as was the operating potential, thereby allowing the operating and marking potentials to be removed—for example on release of the control circuit to serve another call—without release of the relays. The establishment of the holding connection, which results in the flow of holding current through the serially connected operated relays in the established control connection, may be controlled at either end of the control connection: that is, either the holding potential may be permanently connected and the aforesaid potential approximating the marking potential switched in at a suitable time after the operation of the last relay in the sequence, or this latter potential may be permanently connected and the holding potential switched in at a suitable time. In either case the switching means controlling the establishment of the holding connection may also be used for interrupting it to release the relays on clear-down of the communication path.

One feature of the invention resides in the use of Zener diodes as "ON"–"OFF" switches in the establishment of a communication path through the multi-stage cross-point network.

Another feature of the invention relates to the use of Zener diodes in the path pulling arrangement whereby an operating potential is simultaneously applied to the stages of the selected path.

Figure 2:
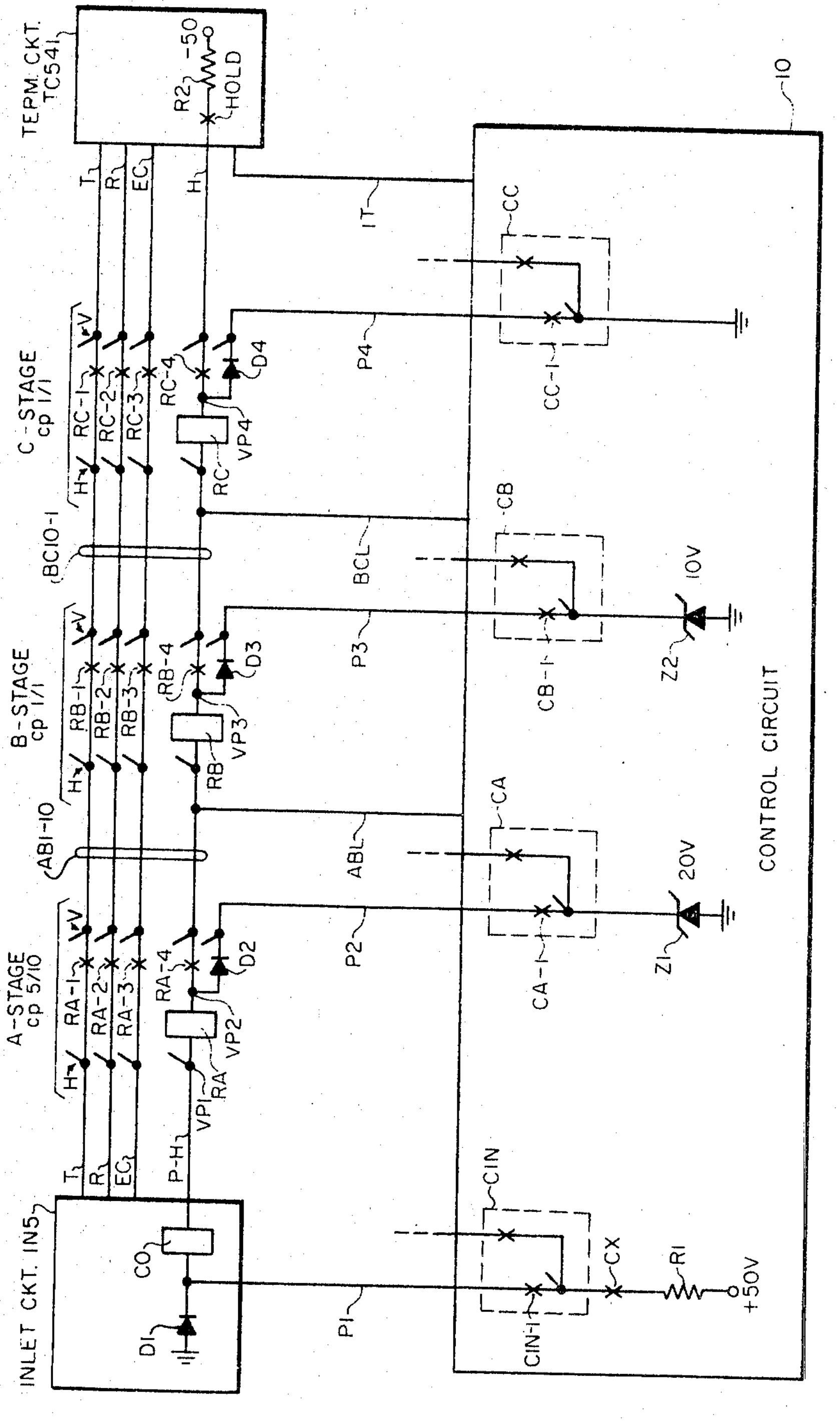

The invention and its advantages will be more fully understood from the following detailed descripiton when considered with the accompanying drawings, in which:

FIG. 1 is a diagrammatic representation of a switching unit having three stages of co-ordinate relay switching; and FIG. 2 is a schematic circuit diagram showing one cross-point in each of the three stages and illustrating how a particular communication path through the stages is established.

DESCRIPTION OF THE PREPARED EMBODIMENT

The drawings are intended only to illustrate the principle of the invention, and accordingly do not include details which are not relevant for this purpose. For instance, FIG. 1 shows only the number of frames, the number of switches per frame and the number of crossings per switch which are required for the explanation of a typical application of the invention. In FIG. 2 the manner of controlling contacts is not shown as this forms no part of the invention and is well within the understanding and ability of those versed in the design of relay cross-point systems, having regard to the usual marking arrangements which are included in such systems and in co-ordinate switching systems (including cross-bar systems) in general.

Referring to FIG. 1, there is represented a three-stage switching unit, such as a group selector described in U.S. Patent No. 3,170,041 to K. K. Spellnes; and in Klees et al. application Ser. No. 414,174, filed Nov. 27, 1964 for "Arrangements in a Communication Switching System," also assigned to the assignee of the instant case, comprising a switching network for making connections between calling side terminals or inlets and called side terminals or outlets. As shown in the Spellnes and the Klees et al. disclosures, as many as ten group selector switching units are served by a common control circuit. FIG. 1 shows one switching unit. In each switching unit, three stages of cross-point switches are provided. The first stage, the A stage, contains sixty cards of fifty cross-points, each arranged in a 5 x 10 matrix, five horizontal multiples and ten vertical multiples, of which the first and last of each the horizontal and vertical multiple is shown. Each horizontal multiple is associated with its respective inlet circuit, thereby providing three hundred inputs, and each vertical multiple appearing as an inlet to the second stage, the B stage, providing six hundred outlets or AB links (one hundred for each of the six "hundreds" group). The B stage contains sixty cards of sixty cross-points each, in a 10 x 6 matrix, with only the first and last of each horizontal and vertical shown, having three hundred sixty outlets or links (sixty for each of the six "hundreds" group) appearing as inlets to the third stage, the C stage. The C stage, uses a basic arrangement of sixty cross-points in a 6 x 10 matrix, again the first and the last of each horizontal and vertical are shown, with the six hundred outlets connected to the respective terminating circuits. The switching stages are arranged in such a manner that each inlet circuit is associated with ten AB links and sixty BC links, to provide sixty paths for possible at random connections for any inlet to any outlet circuit.

The control circuit 10 has control of all cross-points in the group selector and sets up calls on a one-at-a-time basis. Control circuit 10 recognizes the call for service signal, and from the information received designating the destination of the call, determines the possible paths available, the AB and the BC links, and the availability of the path, idle-busy, before pulling the proper group of cross-points in establishing a connection between the calling inlet circuit and the idle termination circuit.

In describing the action of the control circuit in establishing such communication path in accordance with the invention, it will be assumed that the path is to be established between the inlet circuit IN5 and the terminating circuit TC541. Inlet circuit IN5 being connected to horizontal multiple of matrix card A1 in the A stage and the terminating circuit connected to the vertical multiple of matrix card C55 in the C stage, the path to be established has to include the AB link, the B10 matrix and the BC link, which affords access between these two stages. The establishment of the required path involves the operation of relays for cross-points *cp* 5/10 in matrix card A1 of "hundreds" group 1, *cp* 1/1 in matrix card B10 of "hundreds" group 1 and *cp* 1/1 in matrix card C55.

These cross-points and the required paths have been extracted and shown in more detail in FIG. 2. The path is assumed to include four physical connections, namely T and R conductors (the talking path connections), the EC conductor (the extra control connection) and the P–H conductor (the pull and hold connections). Each cross-point relay such as relay RA for *cp* 5/10 for matrix card A10 has a contact set of four contact pairs RA1, RA2, RA3 and RA4 by which these connections can be extended through the cross-point on operation of the relay. Each cross-point relay such as RA has its winding connected in series with its contact RA4 between the P–H conductors included in the horizontal and vertical multiples defining the cross-point. As shown in FIG. 2, there can thus be established, by operation of relays RA, RB and RC a hold connection P–H extending from the conductor P–H of inlet circuit IN5 over P–H conductor of horizontal multiple H5 of matrix card A10, winding of relay RA, contacts RA4, vertical multiple of matrix A10, link AB, horizontal multiple H1 of matrix B10, winding of relay RB, contact RB4, vertical multiple of matrix B10, link BC, horizontal multiple H1 of matrix C55, winding of relay RC, contacts RC4, and vertical multiple of matrix C55 to the terminating circuit TC541. A holding potential extending from the inlet circuit IN5 to the terminating circuit TC541 becomes effective only after closure of contacts RA4, RB4 and RC4.

From the junction between the winding of each relay such as RA, RB and RC and the contacts such as RA4, RB4 and RC4 in series therewith a marking connection such as P2 for relay RA, P3 for relay RB and P4 for relay RC is taken to the control circuit 10. These marking connections each includes a unidirectional device such as diodes D2, D3 and D4. Also individual marking connections are taken to the control circuit 10 from the inlet circuit IN5 such as P1, and from the terminating circuits TC541, such as IT.

In a switching unit where three or more switching stages are tandem-connected, giving a choice of paths through the intermediate stage or stages between particular matrices in the first and the last stages, the control circuit in addition to the identity of the inlet circuit and terminating circuit or circuits, may require the condition of available links (busy-idle). With the present arrangement, these conditions of the interstage link can be determined from the presence or absence of the potential on their P–H conductors. When a communication path has been established, and the relays involved held in the established hold connection between the negative holding potential at one end and ground at the other end, these relays will provide a potential dividing action which results in negative potential being present on the P–H conductors of the relevant links. These potentials can therefore be extended to the control circuit, over leads such as ABL and BCL as busy marking potentials. Links for which these negative potentials are absent are thereby designated as being free.

In the control circuit 10 there are shown four sets of contacts CIN, CA, CB and CC. Control circuit 10 having the identity of the inlet circuit, destination of the call and the available terminating circuit and the availability of the AB and BC links, can now proceed to establish a connection for the communication path. The manner and the circuitry required for this operation will not be disclosed herein as this forms no part of the invention and is well within the understanding of those skilled in the art. One such method is described in the aforementioned Spellnes and Klees et al. disclosures. In the instant case establishment of a path requires closure of contacts (by means not shown) in each of the contact sets CIN, CA, CB and CC.

In the set of contacts CIN, each contact corresponds to the inlet circuit. Contacts CIN are selectively operated according to the inlet circuit requesting service. In the example shown in FIG. 2, contacts CIN–1 would be operated, thereby applying a +50 v. potential via resistor 1, contacts CX, which are closed when the connection is initiated, contacts CIN–1, conductor P1, winding of relay CO, P–H conductor of the H5 multiple of matrix A1 to one side of the winding of relay RA.

In the set of contacts CA, each contact corresponds to the particular A stage vertical multiple. Thus, in the present example contacts CA–1 when closed extend a marking potential via Zener diode Z1, contacts CA–1, conductor P2, diode D2, conductor P–H to the other side of the winding of relay RA.

In the set of contacts CB, each contact corresponds to the particular B stage vertical multiple. Again, in the present example, contacts CB–1 when closed extend a marking potential via Zener diode Z2, contacts CB–1, conductor P3, diode D3, conductor P–H of vertical V1 card B10 to one side of the winding of relay RB.

Likewise, in the set of contacts CC, each contact corresponds to the particular C-stage vertical multiple. Thus, on the closure of contacts CC–1, in the present example, a marking potential is extended through contacts CC–1, conductor P4, diode D4, conductor P–H of vertical V1 card C55 to one side of the winding of relay RC.

The manner of marking can be of any known arrangement. For example, a relay tree as used in the aforementioned Spellnes and Klees et al. disclosures, whereby a set of contacts such as CA (FIG. 2) can be a relay tree, for selecting a particular "hundreds" group, a particular A matrix card and dependent on the vertical multiple to be used to exclude busy and unused links thereby marking the selected link.

Note that the marking connections from the junction between the winding of the cross-point relay and its make contacts in series with it, of interstage links include a series connected Zener diode in the control circuit 10. In general, Zener diodes when forward-biased act in the same manner as regular diodes. When reverse biased, they block the current until the back voltage reaches a breakdown voltage, known as the Zener voltage, and the diode begins to conduct. When the Zener voltage has been reached the characteristics of Zener diodes are such that an essentially constant voltage is maintained across the diode and applied to the load in parallel with it. This reverse biased characteristic of the Zener diode is that used in the present path pulling arrangement.

Referring to FIG. 2, assume that a communication path is to be established between the inlet circuit IN5 and the terminating circuit TC541, and the control circuit 10 has determined (by means not shown) the cross-points to be used in the connection, and has extended the marking potential to the selected path by closing contracts CA–1, CB–1 and CC–1 and by closing contacts CIN–1 has prepared an operating path to the inlet circuit requesting service. The required path is set up as follows.

At the appropriate time contacts CX are closed extending a +50 v. potential via resistor R1 contacts CX, contacts CIN–1, conductor P1, the winding of relay CO in the inlet circuit, P-H conductor and the winding of relay RA. Since the contacts RA–4 are open this potential is extended via diode D2, conductor P2, contacts CA–1, and Zener diode Z1 to ground. Zener diode Z1 has a nominal or breakdown Zener voltage of 20 v. Twenty volts are dropped across the diode Z1 and the remaining 30 volts, assuming resistances are the same, are distributed equally across resistor R1, relay CO and relay RA causing relays CO and RA to operate. Relay RA closes its contacts RA–1, RA–2, RA–3 and RA–4, the latter extending a pulling path to relay RB via the winding of relay RB, diode D3, conductor P3, contact CB–1, and Zener diode Z2 to ground.

Zener diode Z1 maintains 20 volts across the shunt load, which includes relay RB and Zener diode Z2. Zener diode Z2 has a nominal or breakdown Zener voltage of 10 volts, whereby 10 volts are dropped across it, and the remaining 10 volts are dropped across relay RB, assuming the resistance of relay RB to be the same as relay RA, CO or resistor R1. This action causes Zener diode Z1 to essentially shut off and all current flows through relay RB and Zener diode Z2. Relay RB operates and closes its contacts RC–1, RC–2, RC–3 and RC–4, the latter extending a pulling path through relay RC via the winding of relay RC, diode D4, conductor P4 and contacts CC–1 to ground.

When contacts RB–4 close the remaining 10 volts across the diode Z2 is extended via the winding of relay RC, diode D4, conductor P–4, and contacts CC–1 to ground. Relay RC operates and the diode Z2 is shut off. Relay RC at contacts RC–1, RC–2, RC–3, and RC–4 completes a communication path from inlet circuit IN5 to terminating circuit TC541. The cross-points of the selected path are now held in series via a path extending from +50 v., resistor R1, contacts CIN–1, conductor P1, relay CO, conductor P–H, relay RA, contacts RA–4, relay RB, contacts RB–4, relay RC, diode D4, conductor P4, and contacts CC–1 to ground. Zener diodes Z1 and Z2 are now excluded from the marking leads to the cross-points.

The communication path including conductors T, R, EC and P–H is now extended between the inlet circuit IN5 and terminating circuit TC541. The control control conductor, such as EC, can now be used to seize the terminating circuit. A signal on the EC conductor via the inlet circuit, contacts RA–3, RB–3 and RC–3 may be supplied to operate a hold relay H in the terminating circuit TC545. Relay H upon operation closes its H–1 contacts, connecting a holding potential to the selected path. The holding path extends from ground potential in the inlet circuit, diode D1, relay CO, conductor P–H, relay RA, contacts RA–4, P–H conductor of AB link, relay RB, contacts RB–4, P–H conductor of BC link, relay RC, contacts RC–4, conductor H, HOLD contacts in the terminating circuit, and resistor R2 to −50 v. potential. Assuming the resistances of relays CO, RA, RB, RC and resistor R2 are the same the voltage is distributed equally, with points VP1, VP2, VP3 and VP4 being at −10 v., −20 v., −30 v., and −40 v. potential respectively. The operated contacts in contact sets CIN, CA, CB and CC now be reopened and the control circuit released.

Although in the foregoing description a positive operating potential and, a pulling potential (+50 v.) and a holding potential (−50 v.) have been employed for setting and holding connections, it will be understood that other suitably related potentials could be employed.

The established control connection is free from interference by operation of the control circuit in establishing subsequent calls, because the diodes D2 and D3 are backed off by the negative potentials which appear, by voltage divider action, at points VP2, VP3 and VP4. Furthermore, the established connection may be subsequently released independently of the control circuit, and therefore irrespective of its condition, simply by interrupting the holding potential at the HOLD contacts.

From the foregoing description it can be seen that a pulling potential can be applied simultaneously to the selected path, for connecting the two end terminals in the switching system, by use of Zener diodes on the inter-stage marking connections. The Zener diodes with appropriate ratings, supply the voltage differentials required for operating the relays involved in the line circuit, and by the operation of the link contacts placing a shunt across the Zeners to thereby eliminate the requirement for additional switching means for removing the marking potential from the operated circuit while the subsequent relay in the following stage is being operated.

What is claimed is:

1. In a multi-stage relay cross-point switching system having its cross-points defined between multiples includes control conductors and having its stages connected by links including corresponding control conductors, a relay for each cross-point having an operating winding and a make contact connected in series with each other between the control conductors of the multiples defining the cross-point, a marking connection extending from the junction between the said winding of each relay and its said make contact and including a unidirectionally conductive device and control circuit means having said marking connections extending thereto and capable of controlling, in respect of any communication path through successive stages, the establishment by way of said control conductors in the links between these stages, of a control connection which includes the series-connected operating winding and make contact of a relay in each such stage with the winding of such relay in each case electrically nearer a particular end of the control connection than is the contact, said control circuit means comprising means for selecting and applying a marking potential to marking connections of the relays involved in said control connection, and means for applying an operating potential to said particular end of said control connection, said marking potential being of such polarity with respect to the operating potential that the unidirectionally conductive devices in the marked marking connection will permit a resultant flow of operating current for the relay; the improvement comprising:

a first Zener diode, connected in series with the marking potential and the marking connection extending from the junction between one terminal of the winding and the make contacts of the first relay involved in said control connection; said Zener diode having a nominal Zener voltage dependent on the voltage required to operate subsequent circuits;

a second Zener diode, connected in series with marking potential and the marking connection extending from the junction between one terminal of the winding and the make contacts of the second relay involved in said control connection, said second Zener diode having a nominal Zener voltage smaller than said first Zener diode, but sufficient to operate subsequent circuits in said control connection; and a marking potential connected to the marking connection extending from the junction between one terminal of the winding and the make contacts of the third relay involved in said control connection;

said operating potential applied to the other winding terminal of said first relay operating said first relay and said first Zener diode in series with it, closing the contacts of said first relay in series with its winding to allow an operating potential to be extended to said second relay and said second Zener diode connected to series therewith, causing said first Zener diode to shut off and said second relay and said second diode to operate and close the contacts of said second relay in series with its winding to thereby extend the operating potential to the third relay in said control connection, whereupon said second Zener iode shuts off and said control connection is held by an operating potential extended via said first and second relay windings and their series connected contacts and the winding of said third relay and its marking potential.

2. A system as claimed in claim 1, including holding means for completing, after operation of the third relay in said sequence, a holding connection for the operated relays extending over said control connection, said means including a source of holding potential having one terminal connected at the other end of the control connection and having a polarity opposite that of the operating potential with respect to the marking potential, and having a second terminal connected at the same end of the control connection as was the operating potential, said second terminal being at a potential approximating said marking potential.

3. In a multi-stage relay cross-point switching system having its cross-points defined between multiples including control conductors and having its stages connected by links including corresponding control conductors, a relay for each cross-point having an operating winding and a make contact connected in series with each other between the control conductors of the multiples defining the cross-point, a marking connection extending from the junction between the said winding of each relay and its said make contact and including a unidirectionally conductive device and control circuit means having said marking connections extending thereto and capable of controlling, in respect to any communication path through successive stages, the establishment by way of said control conductors in the links between these stages, of a control connection which includes the series-connected operating winding and make contact of a relay in each such stage with the winding of such relay in each case electrically nearer a particular end of the control connection than is the contact, said control circuit means comprising means for selecting and applying a marking potential to marking connections of the relays involved in said control connection, and means for applying an operating potential to said particular end of said control connection; the improvement comprising:

a circuit including a Zener diode connected in series with the marking potential and the connection extending from the junction between one terminal of the winding and the make contact of a cross-point relay, said Zener diode operated to allow the operating potential applied to the other terminal of said relay winding to operate said relay causing closure of said contacts connected in series with said winding to thereby extend said operating potential to the next circuit, said next circuit having a potential therein corresponding to said Zener diode marking potential, so that said Zener diode shuts off and said operating potential is extended only through said winding and said contacts to said next circuit.

4. A circuit comprising: a relay having a winding and a set of make contacts, a first potential source connected to one terminal of the winding of said relay, a source of a second potential and first switching means for switching said second potential connected to the other terminal of said winding through said set of make contacts, an operating circuit including a source of third potential of the same polarity as said second potential, a Zener diode and second switching means connected in series in that order to the junction between said other terminal of said winding and said contacts; said first and second switching means upon actuation being effective to first complete an operating path to said relay from said first potential through said relay winding and said operating circuit including said Zener diode to said third potential, to thereby operate said relay and close said contacts to extend said first potential to said second potential and causing said Zener diode to shut off said third potential.

References Cited

UNITED STATES PATENTS 3,395,253 7/1968 Warman.

FOREIGN PATENTS 1,040,651 Great Britain.

DONALD J. YUSKO, Primary Examiner

U.S. Cl. X.R.

179—18